(12) United States Patent
Deng et al.

(10) Patent No.: US 10,059,021 B2
(45) Date of Patent: Aug. 28, 2018

(54) SUBSTRATE CUTTING SYSTEM

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Junneng Deng, Beijing (CN); Tao Deng, Beijing (CN); Minjiang Fan, Beijing (CN); Hongyi Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengu, Sichuan (CN)

( * ) Notice: Subject to any disclaimer, the term of this patent is extended or adjusted under 35 U.S.C. 154(b) by 127 days.

(21) Appl. No.: 15/137,337

(22) Filed: Apr. 25, 2016

(65) Prior Publication Data
US 2017/0036367 A1    Feb. 9, 2017

(30) Foreign Application Priority Data

Aug. 3, 2015    (CN) .......................... 2015 1 0484431

(51) Int. Cl.
B28D 7/02    (2006.01)
B26D 7/18    (2006.01)
(Continued)

(52) U.S. Cl.
CPC ........... *B26D 7/1845* (2013.01); *B26D 5/007* (2013.01); *B26D 7/018* (2013.01); *B26D 7/088* (2013.01); *B28D 7/02* (2013.01); *B01D 21/267* (2013.01)

(58) Field of Classification Search
CPC .... B26D 7/1845; B26D 5/007; B01D 21/262; B28D 1/025; B28D 1/04; B28D 7/02
(Continued)

(56) References Cited

U.S. PATENT DOCUMENTS 3,618,707 A * 11/1971 Sluhan ............... B23Q 11/1069
                                                184/109
6,193,586 B1 * 2/2001 Park ........................ B24B 7/228
                                                451/388
(Continued)

FOREIGN PATENT DOCUMENTS

CN    101851060 A    10/2010
CN    103288342 A    9/2013
(Continued)

OTHER PUBLICATIONS

First Chinese Office Action dated May 18, 2016; Appl. No. 201510484431.4.

*Primary Examiner* — Kenneth E. Peterson
*Assistant Examiner* — Nhat Chieu Do
(74) *Attorney, Agent, or Firm* — Ladas & Parry LLP; Loren K. Thompson

(57) ABSTRACT

A substrate cutting system is provided. The substrate cutting system includes a cutting tank, an object stage, a cutter assembly, an injection pump and a drain pump; the injection pump is configured to inject water into the cutting tank, and the drain pump is configured to draw water out from the cutting tank. A flowable water environment is formed in the cutting tank by an action of the injection pump and the drain pump. The object stage is a movable base configured to transport a substrate to be cut to the water environment in the cutting tank. The cutter assembly is configured to cut the substrate.

13 Claims, 2 Drawing Sheets

(51) Int. Cl.
  *B26D 7/01* (2006.01)
  *B26D 5/00* (2006.01)
  *B26D 7/08* (2006.01)
  *B01D 21/26* (2006.01)

(58) Field of Classification Search
  USPC .............. 125/21, 16.02, 13.01; 451/449–450
  See application file for complete search history.

(56) References Cited

U.S. PATENT DOCUMENTS

| | | | |
|---|---|---|---|
| 7,810,482 B2 * | 10/2010 | Gifford | B23D 47/02 |
| | | | 125/13.01 |
| 8,734,751 B2 * | 5/2014 | Iang | B01D 61/58 |
| | | | 203/31 |

FOREIGN PATENT DOCUMENTS

| | | | |
|---|---|---|---|
| CN | 103524027 A | | 1/2014 |
| CN | 104385470 A | | 3/2015 |
| JP | 06170835 A | * | 6/1994 |
| JP | 2003-292331 A | | 10/2003 |
| JP | 2012-035353 A | | 2/2012 |

* cited by examiner

SUBSTRATE CUTTING SYSTEM

TECHNICAL FIELD

Embodiments of the present disclosure relate to a substrate cutting system.

BACKGROUND

A cutting device of substrate is illustrated in FIG. 1. Upon a cutter wheel assembly 1 running across a surface of a substrate 2, it may generate substrate material debris 20. To prevent the debris 20 from remaining at the cutting line, an air ejection device 19 is enabled during a cutting process to allow the debris 20 sputtering into surroundings. However, it still inevitably remains some debris 20 on the surface of the substrate.

SUMMARY

Embodiments of the present disclosure provide a substrate cutting system, including: a cutting tank, an object stage, a cutter assembly, an injection pump and a drain pump. The injection pump is configured to inject water into the cutting tank; and the drain pump is configured to draw water from the cutting tank. A flowable water environment is formed in the cutting tank by an action of the injection pump and the drain pump. The object stage is a movable base and is configured to transport a substrate to be cut to the water environment in the cutting tank. The cutter assembly is configured to cut the substrate.

The injection pump is connected to the cutting tank through a first pipeline. The drain pump is connected to the cutting tank through a second pipeline. The injection pump and the drain pump are connected through a third pipeline.

The third pipeline is provided with a centrifugal separation tank, and the bottom of the centrifugal separation tank is provided with a discharge valve.

The third pipeline is further provided with a reservoir, and the reservoir is disposed between the centrifugal separation tank and the injection pump.

The third pipeline is further provided with a filter, and the filter is disposed between the reservoir and the injection pump.

The object stage is disposed below the cutting tank, and a driving device is provided under the bottom of the object stage and configured to drive the object stage to move upwards and downwards. The bottom of the cutting tank is provided with an opening. The substrate is moved with the object stage to pass through the opening and to be transported into the water environment in the cutting tank.

The object stage fixes the substrate by a suction component. The suction component includes a cutting tray and a plurality of air pipelines. The cutting tray is disposed on the object stage and is provided with suction holes connected to the plurality of air pipelines.

The plurality of air pipelines are converged at a main air pipeline, and the main air pipeline is provided with an air supply device and an air suction device.

The interior of the object stage is provided with a plurality of channels therethrough which are configured to receive the air pipelines, and each of the channels has one end communicated with the cutting tank and the other end communicated with the drain pump.

The cutting tray is provided with an alignment component configured to limit a location of the substrate.

The cutting tray is provided with a perforated cushion, and the perforated cushion is laid below the substrate.

The cutter assembly includes a cutter wheel and a cutter base. The cutter wheel is disposed on the cutter base; and the cutter base is disposed above the cutting tank and is configured to drive the cutter wheel to move upwards and downwards. The bottom of the cutter base is provided with a baffle.

BRIEF DESCRIPTION OF THE DRAWINGS

Embodiments of the present disclosure will be described in more detail below with reference to the accompanying drawings to enable those skilled in the art to understand the present disclosure more clearly, in which.

DETAILED DESCRIPTION OF THE PREFERRED EMBODIMENTS

Figure 1:
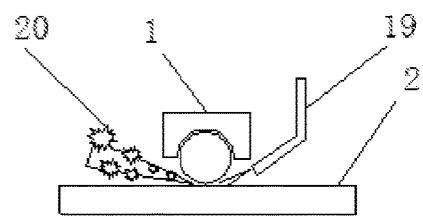
FIG. 1 is a schematic diagram illustrating a working state of a cutting device when cutting a substrate.

Technical solutions according to the embodiments of the present disclosure will be described clearly and completely as below in conjunction with the accompanying drawings of embodiments of the present disclosure. It is apparent that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "in," "out" or the like are only used to indicate relative position relationship, and when the position of the object which is described is changed, the relative position relationship may be changed accordingly.

It should be further explained that, unless otherwise defined, terms as used in the description of the embodiments in the present disclosure such as "mount", "connect" and "connected" shall be interpreted in their broadest conceptions. For example, it can be a fixed connection or a detachable connection or an integral connection; it can be a mechanical connection or an electrical connection; it can be a direct connection or an indirect connection through an intermediate. For one ordinary skill in the art, specific meanings of the above-mentioned terms as used in embodiments of the present disclosure can be understood according to particular conditions.

The inventors notice that it requires a cutter wheel used for cutting a substrate to have certain penetration performance; moreover, the thicker the product is, the larger the notch depth and the better the penetration performance of the cutter wheel are required, which also generate more debris from the cutting. The debris or fragments have a microcosmic surface with irregular polygon shape and may scratch a surface or metallic leads of a product if they are left on the product. For example, if they scratch lines at an electrode edge may cause lineless failure or line failure, and if they scratch an on-cell product or a touch-screen cover product may cause touch-control failure. Furthermore, the exiting cutting process serves as a starting process of a module assembly process, it is inevitable for a mechanical cutter wheel to generate a large number of debris which will be brought into subsequent module assembly process by operators or material flows and leads to failure due to these particles. Additionally, the conventional water-jet cutting technology cannot be directly applied in the substrate due to the poor cutting accuracy, requirement of adding abrasive material which can introduce additional foreign matters, and high hydraulic pressure which may result in sputtering to damage other components, as well as rough cutting-section and low strength of final product. As a result, the water-jet cutting technology is not appropriate for cutting a substrate, such as a glass substrate, a plastic substrate or a quartz substrate.

Figure 2:
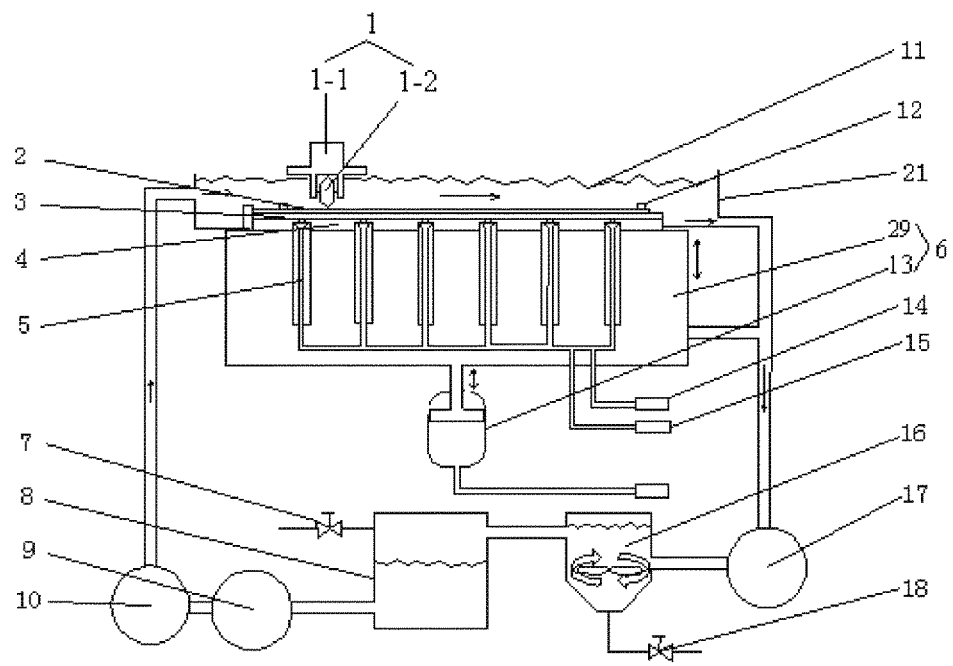
FIG. 2 is a schematically structural view illustrating a substrate cutting system as provided by an embodiment of the present disclosure.

An embodiment of the present disclosure discloses a substrate cutting system as illustrated in FIG. 2, including: a cutting tank 21, an object stage 6, a cutter assembly 1 including a cutter base 1-1 and cutter wheel 1-2, an injection pump 10 and a drain pump 17.

The injection pump 10 is configured to inject water into the cutting tank 21. The drain pump 17 is configured to draw water from the cutting tank 21. A flowable water environment can be formed in the cutting tank 21 by an action of the injection pump 10 and the drain pump 17. The flow direction of the water in the water environment is indicated by an arrow in the cutting tank 21 as illustrated in FIG. 2. Debris 20 generated during a cutting process in cutting tank 21 can be brought away by an action of water flow in the water environment.

The object stage 6 is a movable base. The object stage 6 is configured to bear a substrate 2 to be cut and transport the substrate 2 into the cutting tank 21 before cutting the substrate 2.

The structure of the object stage 6 is designed to include a movable base 29 and a driving device 13, which enable it to move the substrate 2 into the cutting tank 21. At the same time, the cutter assembly 1 including the cutter base 1-1 and cutter wheel 1-2 is configured to cut the substrate 2. The cutting process is performed in the water environment of the cutting tank 21.

It is understood that the substrate cutting system in embodiments of the present disclosure is a device which allows a substrate to be cut in a water environment. By using the substrate cutting system, the debris 20 generated during the cutting process can be removed in good time through the flowing water environment so as to significantly reduce particle sources of the module assembly process and greatly improve maintaining cleanliness of a clean room. At the same time, it can also solve technical problems that the debris 20 remaining on the substrate may result in the surface scratching or line scratching which may result in the line failure, and the cutting process of on-cell substrate and touch-screen cover substrate is improved.

The substrate cutting system can be used in cutting a glass substrate, a plastic substrate, a quartz substrate or the like.

For reusable, the substrate cutting system of the present embodiment may also utilize a circulation loop mechanism to form a circulated de-ionized water flow 11 in the cutting tank 21.

For example, the injection pump 10 is connected to (i.e., communicated with) the cutting tank 21 through a first pipeline, and the drain pump 17 is connected to (i.e., communicated with) the cutting tank 21 through a second pipeline. The injection pump 10 and the drain pump 17 are connected (i.e., communicated) through a third pipeline. In this way, the cutting tank 21, the first pipeline, the second pipeline and the third pipeline form a water circulation loop.

For example, the third pipeline is provided with a centrifugal separation tank 16, and the centrifugal separation tank 16 is provided with (for example, at the bottom thereof) a discharge valve 18. Upon switching on the discharge valve 18, debris 20 separated from the centrifugal separation tank 16 can be discharged.

For example, the third pipeline is further provided with a reservoir 8, the reservoir 8 is disposed between the centrifugal separation tank 16 and the injection pump 10. The reservoir 8 contains water at an amount of first preset value to supply the injection pump 10 with a water source, while stores water drawn through the drain pump 17 to allow recyclable using of the water.

For example, the reservoir 8 is further provided with a water adding valve 7. The water adding valve 7 is switched on upon a water amount in the reservoir 8 being below a second preset value, so as to supply the reservoir 8 with a water source until the water amount reaches the first preset value.

For example, the third pipeline is provided with a filter 9, and the filter 9 is disposed between the reservoir 8 and the injection pump 10 to filter impurities in the water body so as to prevent the impurities in the water from flowing into the cutting tank 21 and polluting the substrate.

The drain pump 17 injects the de-ionized water carrying with debris 20 discharged from an outlet of the cutting tank 21 into the centrifugal separation tank 16 which keeps running; then a solution stirring at the lower portion of the centrifugal separation tank 16 allows the debris 20 to precipitate to the bottom of the centrifugal separation tank 16; the de-ionized water having the debris 20 removed overflows to the reservoir 8; then a recyclable use of the deionized water is achieved. The discharge valve 18 at the bottom of the centrifugal separation tank 16 is switched on periodically to discharge the debris 20, which can effectively extend a serve life of a filter element of the filter 9; furthermore, it can also supplement deionized water by water adding valve 7 so as to maintain the amount of the circulated water.

The object stage 6 is disposed below the cutting tank 21, and under the bottom of the object stage 6, a driving device 13 is provided and configured to drive the object stage 6 to move upwards and downwards. The driving device 13 can be of any form which is flexibly selected according to practical demands, for example, it can be a mechanism for providing the object stage 6 with driving force. For example, the driving device 13 can be an air cylinder connected to an air source (CDA). The driving device 13 can also be a motor connected to the object stage 6 through a transmission component. Correspondingly, the bottom of the cutting tank 21 is provided with an opening which can be blocked by the object stage 6 upon the object stage 6 moving upwards. Furthermore, the substrate 2 can be driven by the object stage 6 to pass through the opening and enters the water environment in the cutting tank 21. Thus the object stage 6 and the cutting tank 21 have novel designs with safe and reliable structure as a whole.

For example, the substrate 2 is fixed on the object stage 6 by vacuum suction technology. In other words, the object stage 6 fixes the substrate 2 by a suction component. The suction component includes a cutting tray 4 and a plurality of air pipelines 5. The cutting tray 4 is disposed on the object stage 6 and is provided with suction holes connected to the plurality of air pipelines 5. The plurality of air pipelines 5 are connected to a main air pipeline, the main air pipeline is provided with an air supply device 14 (e.g., CDA, clean dry air) and an air suction device 15 (e.g., VAC, vacuum system).

The interior of the object stage 6 is provided with a plurality of channels which are configured to receive the air pipelines 5, and the channels are penetrated through the object stage 6. Each of the channels has one end communicated with the cutting tank 21 and the other end communicated with the drain pump 17. These channels are configured to receive the air pipelines 5 and discharge the remaining deionized water in the cutting tank 21. These channels can be connected to a third pipeline (i.e., communicated with the drain pump 17). When the remaining deionized water in the cutting tank 21 is discharged through the channels in the object stage 6, the air supply device 14 is switched on so as to prevent water flowing into the air pipelines 5.

In the present embodiment, the cutting tray 4 may also be provided with an alignment component 12 which is configured to limit a location of the substrate 2. Additionally, the cutting tray 4 may also be provided with a perforated cushion 3. The perforated cushion 3 is laid beneath the substrate 2. For example, the perforated cushion 3 is made of Teflon which is readily available and less likely to make scratching.

In the present embodiment, the cutter assembly 1 includes a cutter wheel 1-2 and a cutter base 1-1, and the cutter wheel 1-2 is disposed on the cutter base 1-1 and is configured to cut the substrate 2. The cutter base 1-1 is disposed above the cutter tank 21 and configured to drive the cutter wheel 1-2 to move upwards and downwards; the bottom of the cutter base 1-1 is provided with a baffle to prevent water from sputtering onto other components.

Embodiments above are merely set forth for purpose of illustration and description without covering all the embodiments or limiting the embodiments of the prevent disclosure to the forms as disclosed. Therefore, various modifications or improvements can be made on the basis of the embodiments above. For example, a camera can be provided above the substrate cutting system so as to search for cutting marks after the substrate 2 is sucked and to feedback the cutting marks to a control system for computing the location information so that the control system can automatically controls the substrate cutting system to operate.

Figure 3:
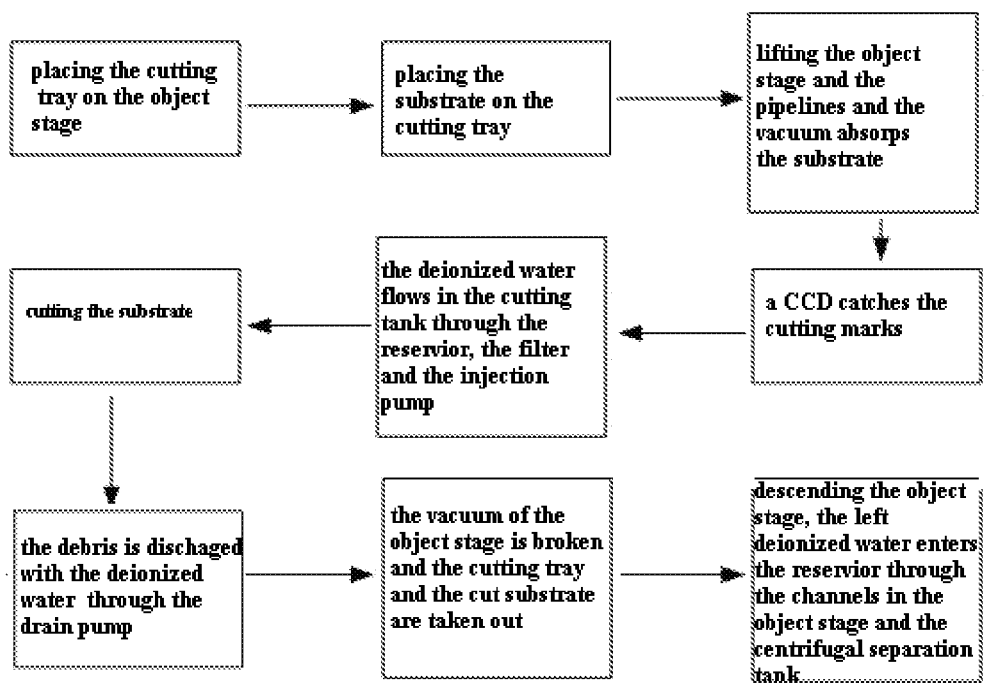
FIG. 3 is a block diagram illustrating a working principle of the substrate cutting system as provided by an embodiment of the present disclosure.

As illustrated in FIG. 3, in an embodiment, the substrate cutting system operates as bellow.

For example, first, the object stage is descended to a descending location by releasing a pressure through a CDA, and a perforated cutting tray is placed onto the object stage. A perforated Teflon film (perforated cushion) is attached onto a surface of the cutting tray. Then a substrate to be cut is placed onto the cutting tray and is aligned by using an alignment component. Then the object stage is lifted while the air pipelines connected to a vacuum device in the object stage being switched on, so as to absorb the substrate. Then a cutting mark on the substrate is searched by using a camera (CCD) and the location information is computed.

The deionized water in the reservoir is filtered through the filter to remove a few remaining debris, and then injected into the cutting tank by the injection pump. The deionized water flow moves towards the outlet of the cutting tank in parallel. When a water level of the cutting tank rises to a desired height, the cutting process can begin. The deionized water carrying with debris discharged from the cutting tank is injected into the centrifugal separation tank which keeps running, by the injection pump. A solution stirring in the lower portion of the centrifugal separation tank allows the debris to precipitate to the bottom of the centrifugal separation tank. Then the de-ionized water having most of the debris removed overflows to the reservoir, so as to achieve recyclable use of the deionized water.

Consequently, the discharge valve at the bottom of the centrifugal separation tank is switched on periodically to discharge the debris. The deionized water can be supplemented by the water adding valve so as to maintain an amount of the circulated water. Upon completing the cutting process, the injection pump is switched off, and the deionized water in the cutting tank enters the reservoir through the drain pump and the centrifugal separation tank. Furthermore, the vacuum device is switched off while the vacuum breaker (CDA) is switched on; then the cutting tray and the substrate having been cut are taken out. The object stage is descended, and the remaining deionized water in the cutting tank enters the reservoir through channels (channels configured to receive the air pipelines) in the object stage, through the drain pump and the centrifugal separation tank, at this time, switching on CDA allows preventing the water from entering the air pipelines. Upon discharging the water, the CDA is switched off, and a cutting process is finished.

With the substrate cutting system as provided by embodiments of the present disclosure, the debris generated by cutting during the substrate cutting process can be taken away by the flowing water environment so as to prevent the debris from entering the surroundings while preventing the debris from remaining on the surface of the product which may result in the failure due to surface scratching, electrode edge scratching and line scratching. Moreover, performing cutting in the water can play a role of pre-cleaning, so as to significantly reduce the consumption of cleanser before module assembly process. Moreover, by using the circulated flow of the deionized water, the usage ratio of water resource can be improved. Also, by using the centrifugal separation technology, the debris in the circulated deionized water can be effectively removed by switching on the discharge valve, which is simple in operation while effectively extending the service life of the filter element of the filter.

The described above are just exemplary embodiments to explain the principle of the embodiments of the present disclosure and the disclosure is not intended to be limited thereto. An ordinary person in the art can make various variations and modifications to the embodiments of the present disclosure without departure from the spirit and the scope of the present disclosure, and such variations and modifications shall fall in the scope of the present disclosure.

The present application claims the priority of Chinese patent application No. 201510484431.4 filed on Aug. 3, 2015 and entitled "A SUBSTRATE CUTTING SYSTEM", which is entirely incorporated herein by reference.

What is claimed is:

1. A substrate cutting system, comprising:
   a cutting tank;
   an object stage;

a cutter assembly comprising a cutter wheel;
an injection pump; and
a drain pump;
wherein the injection pump is connected to the cutting tank through a first pipeline and configured to inject water into the cutting tank; the drain pump is connected to the cutting tank through a second pipeline and configured to draw water from the cutting tank; and the injection pump and the drain pump are connected through a third pipeline, the third pipeline being provided with a centrifugal separation tank, a reservoir between the centrifugal separation tank and the injection pump, and a filter provided between the reservoir and the injection pump and configured to filter water from the reservoir, the reservoir being provided with a water adding valve, so as to supply the reservoir with a water source;
a flowable water environment is formed in the cutting tank by an action of the injection pump and the drain pump;
the object stage is a movable base and is configured to transport a substrate to be cut to the water environment in the cutting tank; and
the cutter assembly is configured to cut the substrate.

2. The substrate cutting system of claim 1, wherein the centrifugal separation tank is provided with a discharge valve.

3. The substrate cutting system of claim 2, wherein the object stage is disposed below the cutting tank, and a driving device is provided under the bottom of the object stage and configured to drive the object stage to move upwards and downwards; and the bottom of the cutting tank is provided with an opening; the substrate is driven by the object stage to pass through the opening and to be transported to the water environment in the cutting tank.

4. The substrate cutting system of claim 3, wherein the object stage fixes the substrate by a suction component.

5. The substrate cutting system of claim 4, wherein the suction component comprises a cutting tray and a plurality of air pipelines; the cutting tray is disposed on the object stage and is provided with suction holes connected to the plurality of air pipelines; the plurality of air pipelines are converged at a main air pipeline, and the main air pipeline is provided with an air supply device and an air suction device.

6. The substrate cutting system of claim 5, wherein the interior of the object stage is provided with a plurality of channels therethrough which are configured to receive the air pipelines, and each of the channels has one end communicated with the cutting tank and the other end communicated with the drain pump.

7. The substrate cutting system of claim 6, wherein the cutting tray is provided with an alignment component configured to limit a location of the substrate.

8. The substrate cutting system of claim 1, wherein the object stage is disposed below the cutting tank, and a driving device is provided under a bottom of the object stage and configured to move the object stage up and down; the bottom of the cutting tank is provided with an opening; and the substrate is driven by the object stage to pass through the opening and to be transported to the water environment in the cutting tank.

9. The substrate cutting system of claim 8, wherein the object stage fixes the substrate by a suction component, the suction component comprises a cutting tray and a plurality of air pipelines, the cutting tray is disposed on the object stage and is provided with suction holes connected to the plurality of air pipelines; the plurality of air pipelines are converged at a main air pipeline, the main air pipeline is provided with an air supply device and an air suction device.

10. The substrate cutting system of claim 9, wherein the interior of the object stage is provided with a plurality of channels therethrough which are configured to receive the air pipelines, and each of the channels has one end communicated with the cutting tank and the other end communicated with the drain pump.

11. The substrate cutting system of claim 9, wherein the cutting tray is provided with an alignment component configured to limit a location of the substrate.

12. The substrate cutting system of claim 9, wherein the cutting tray is provided with a perforated cushion, and the perforated cushion is laid below the substrate.

13. The substrate cutting system of claim 1, further comprising a cutter base, wherein the cutter wheel is disposed on the cutter base; the cutter base is disposed above the cutting tank and is configured to drive the cutter wheel to move upwards and downwards; and a bottom of the cutter base is provided with a baffle.

* * * * *